United States Patent [19]

Day

[11] 4,063,597
[45] Dec. 20, 1977

[54] ROW MARKER WITH MARKER ARM FOLDED BY SERVO MOTOR

[75] Inventor: Leon E. Day, Memphis, Tenn.

[73] Assignee: Ward A. Warren, Memphis, Tenn.

[21] Appl. No.: 736,751

[22] Filed: Oct. 29, 1976

[51] Int. Cl.² .................. A01B 17/00; A01B 35/32
[52] U.S. Cl. ........................................... 172/126
[58] Field of Search .......... 172/126, 127, 128, 129, 172/130, 131, 132, 456, 463, 311

[56] References Cited

U.S. PATENT DOCUMENTS

| | | | |
|---|---|---|---|
| 3,072,200 | 1/1963 | Yerkes | 172/126 |
| 3,250,333 | 5/1966 | Day | 172/126 |
| 3,524,508 | 8/1970 | West | 172/126 |
| 3,666,019 | 5/1972 | Yeske | 172/130 |
| 3,680,172 | 8/1972 | Couser | 16/163 |
| 3,799,272 | 3/1974 | Watson | 172/126 |

*Primary Examiner*—Richard J. Johnson
*Attorney, Agent, or Firm*—Baldwin, Egan, Walling & Fetzer

[57] ABSTRACT

There is presented a row marker adapted to be used with a tractor carrying seed-dispensing hoppers and having an hydraulic system and having a tool bar carried by the tractor for movement over the ground. The row marker comprises a frame for mounting on one end of the tool bar and carrying a pivoted first arm portion of the marking arm for oscillation between a substantially horizontal working position and a substantially vertical carrying position. A second arm portion of the marking arm has one end pivotally attached to the outer end of the first arm portion at a pivot shaft for oscillating movement between a generally vertical carrying position close to the first arm portion and a generally horizontal working position in alignment with the first arm portion in its working position. A marking element, such as a disc, is attached to the outer end of the second arm portion. The novelty consists in the pivoting and locking parts connecting the first arm portion to the second arm portion, these parts consisting entirely of rigid members pivotally connected to each other so as to provide an inexpensive and trouble free folding structure that will fold into a compact unit for transportation.

3 Claims, 7 Drawing Figures

ROW MARKER WITH MARKER ARM FOLDED BY SERVO MOTOR

BACKGROUND OF THE INVENTION

Most of the row markers available today, having two pivotally connected arm portions in the marker arm, are controlled for folding and unfolding of the arm portions by means of rods, cables, chains or springs. The disadvantages of these earlier constructions were that the marker apparatus would not fold into a compact carrying position, and the second or outer arm portion of the marker arm would swing back and forth during transportation.

An object of the present invention is to do away with all such rods, cables, chains or springs and to provide a connection between the two arm portions of the marker arm which consists entirely of rigid parts firmly connected together by pivots so as to make an inexpensive and trouble free folding means that folds into a compact unit for transportation.

Other objects and advantages of the present invention will be apparent from the accompanying description and drawings and the essential features thereof will be set forth in the appended claims.

Figure 1:
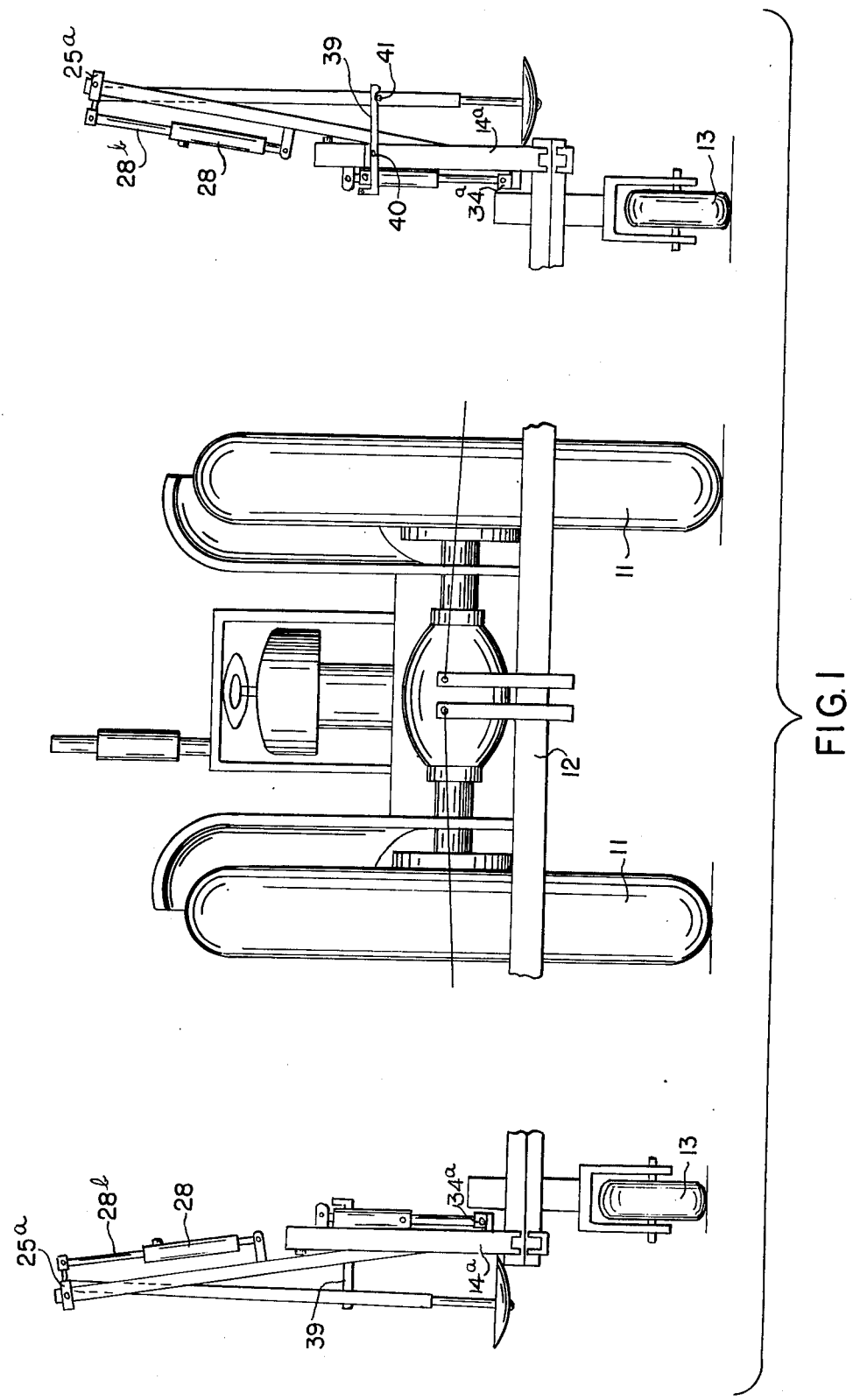
FIG. 1 is a simplified front end elevational view of a tractor vehicle of a usual type used for towing a row marker, the seed-dispensing hoppers being omitted.
Figure 2:
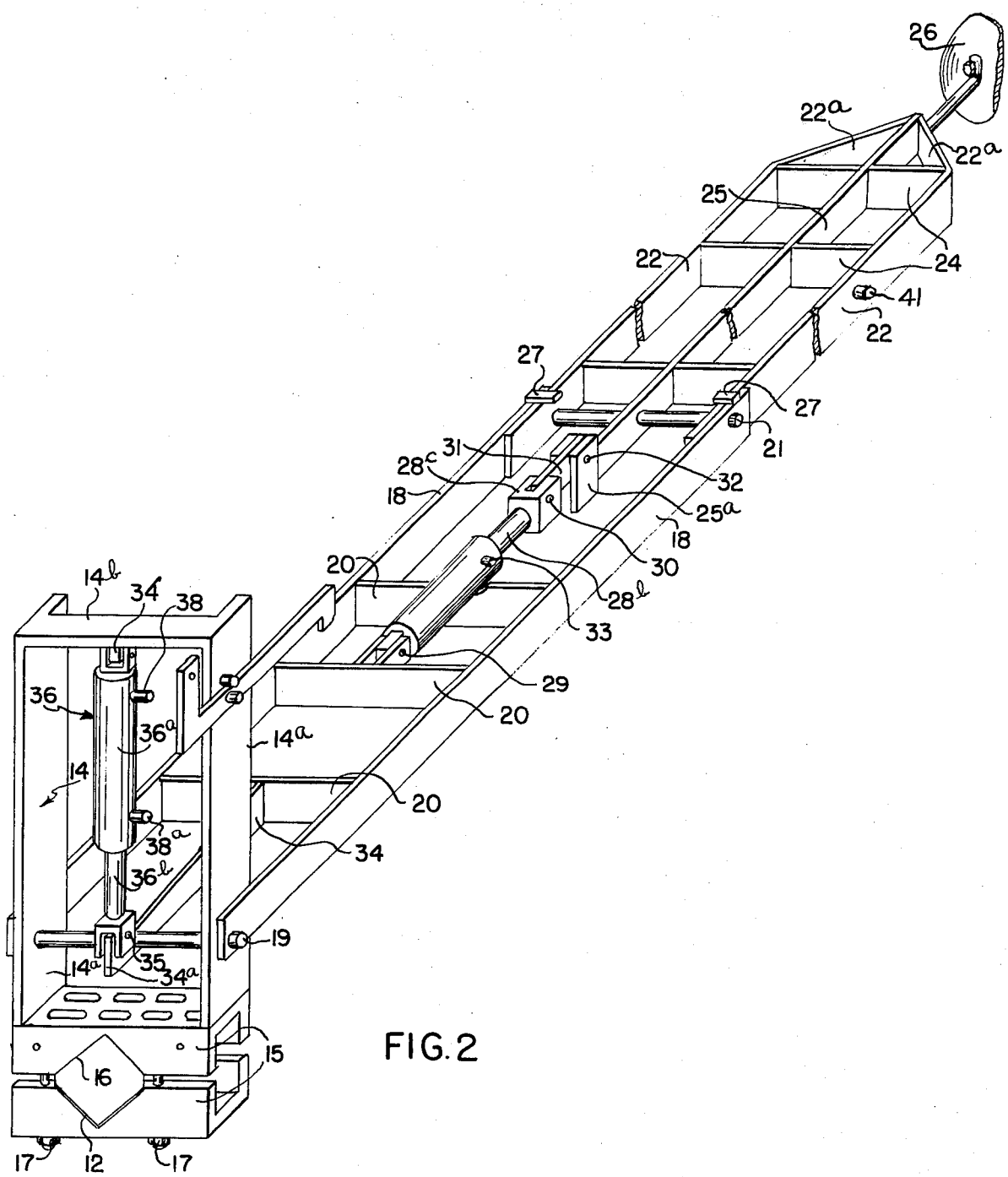
FIG. 2 is a perspective view, enlarged, of one of the row markers mounted on opposite sides of FIG. 1 with the marker in folded carrying position. The marker arm in FIG. 2 is shown unfolded in working position.
Figure 3:
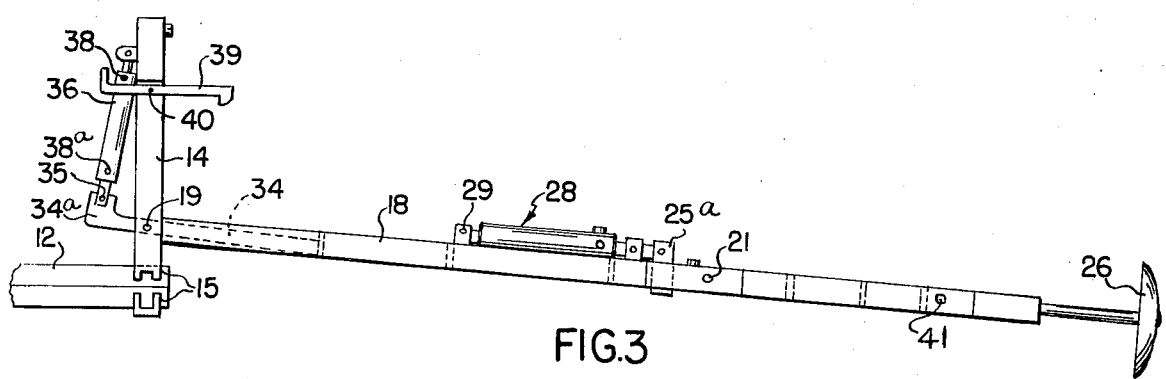

FIG. 3 is a side elevational view of the marker arm of FIG. 2 shown on the same scale as used in FIG. 1; while FIGS. 4, 5, 6 and 7 are respectively views of the folding connection between the first and second arm portions of the marker respectively in folded carrying position, in a position starting to unfold, in a position almost entirely unfolded, and finally in the locked unfolded position herein designated the working position. In FIGS. 4, 5, 6 and 7, the nearer side arm of the marking arm is omitted to more clearly show the action of the parts forming the pivotal connection between the two marker arm portions.

Referring to FIG. 1, a front view of a tractor is shown mounted on wheels 11 to travel over the ground. It will be understood that such a tractor is driven by an engine and is provided with hydraulic equipment with suitable control levers, some of which equipment and levers are used in the proposed operation of the present invention. The tractor has a tool bar 12 which normally supports the seed dispensing hoppers and is here shown as a mounting for the row markers at opposite ends thereof. The outer ends of the tool bar often have additional supporting wheels 13 as shown in FIG. 1.

The marker arm of this invention as best seen in FIGS. 1 and 2 comprises a frame 14 which is rigid and carries at its lower end a clamping means 15 comprising mutually facing channel members having between them an opening 16 adapted to fit snugly over the shape of the tool bar 12, the members 15 being clamped together by suitable bolts 17. The frame 14 has two parallel spaced vertical side members 14a which are rigidly connected at the top by an integral top member 14b. The first arm portion of the marker structure comprises parallel spaced side members 18 which are pivotally mounted at their inner ends on a first pivot shaft 19 which is carried in the side arms 14a of the frame. The side members 18 are rigidly connected together by cross members 20, properly located. The outer ends of the first arm portions 18 are pivotally connected by a second pivot shaft 21 to spaced parallel side arm members 22 of the outer arm portion 23. It will be noted in FIG. 2 that the contiguous ends of the side arm portions 18 and 22 overlap at the second pivot shaft 21 so as to provide a reinforcement of the marker arm in its horizontal working position shown in FIG. 2. The outer or second arm portions 22 are rigidly connected and reinforced by cross members 24 properly spaced. At their outer ends 22a the side arm portions 22 are bent inwardly and rigidly connected to a lifting arm 25, to the outer end of which is attached a marking element such as the disc 26. The lifting arm 25 is a continuous piece extending from the outer end of the marking arm clear to, and beyond the second pivot shaft 21 as clearly shown in FIGS. 2 through 7. This lifting arm is on the center line dividing the parallel arms 22. Stop members 27 are rigidly secured to the arm portions 22 in position to overlie the arm portions 18 when the marking arm is in its extended working position shown in FIGS. 2 and 3. The stop members are urged in stop direction by ground pressure acting upwardly on the marking element 26 on the outer end of the second arm portion.

The parts forming the folding and unfolding connection between the first or inner arm portion of the marking arm with the outer or second arm portion will now be described. At the inner end of the lifting arm 25, toward the left from the second pivot shaft 21 as seen in FIGS. 2, 3, 6 and 7, is a connecting saddle piece 25a which consists of two parallel spaced members on opposite sides of the lifting arm 25 and extending at right angles to the lifting arm upwardly in the working position shown in FIGS. 2 and 3. An operating servo motor 28 consists of a cylinder 28a pivotally connected at 29 to one of the cross members 20 of the first arm portion and a piston having a piston rod 28b extending toward the outer end of the marking arm. A clevis 28c at the outer end of the piston rod has a pivotal connection 30 with one end of a breakover plate 31, and the other end of the break-over plate is pivotally connected at 32 with the saddle piece 25a. Hydraulic pressure is supplied from the tractor to the outer end of cylinder 28a as indicated at 33, together with suitable controls. Power could be supplied at the opposite end of the cylinder 28a if desired but in this case it is not necessary.

The power for oscillating the first arm portion around the pivot shaft 19 on the frame 14 is clearly seen in FIGS. 2 and 3. At the inner end of the arm portions 18 there is provided a rigid short lifting arm 34 centrally of the two side portions 18 and rigidly connected to one of the cross members 20. At the outer end of this arm 34 there is provided an L-shape end 34a to which is pivotally connected at 35 a piston rod 36b which is operated in the cylinder 36a of a servo motor 36 which has its upper end connected to the frame member 14b as indicated at 37. Hydraulic pressure is supplied from the tractor to a connection 38 at the upper end of the cylinder 36a and a second inlet for hydraulic pressure 38a is provided near the opposite end of the cylinder.

If necessary, a latch member 39 may be pivoted at 40 on a frame member 14a so as to hook over a catch 41 on one of the arm side pieces 22 to steady the outer arm portion in carrying position as seen in FIG. 1.

Figure 4:
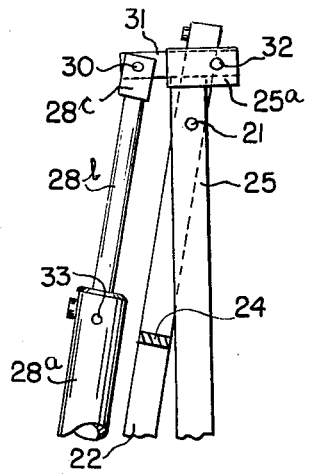
Figure 5:
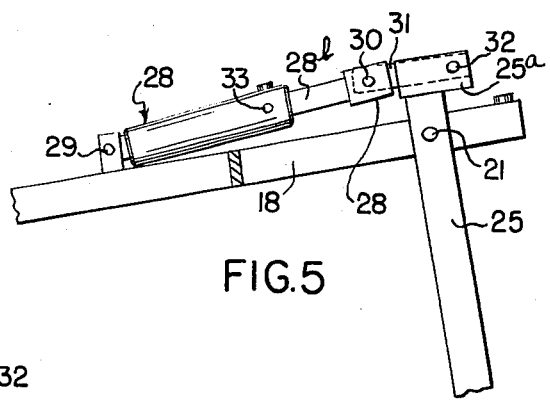
Figure 6:
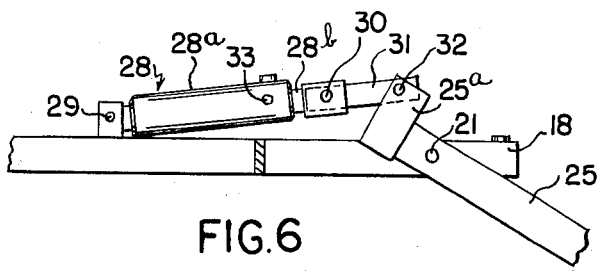
Figure 7:
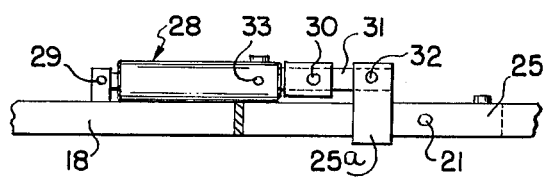

With the parts in the folded position as shown in FIGS. 1 and 4, the operation of the marking arm apparatus is as follows. The hydraulic power is shut off at the inlet 38 to the cylinder 36 and hydraulic pressure is exerted at the inlet 33 in cylinder 28a of the servo motor 28. The parts in the position of FIG. 4 then move serially to the position in FIG. 5, then to the position of FIG. 6, and finally to the position of FIG. 7 and FIG. 3. It will be noted that as the piston rod 28b moves farther and farther into the cylinder 28a, the break-over plate 31 pulls on the pivot 32, as seen in FIGS. 4 to 7, so as to gradually oscillate the lift arm 21 in a counterclockwise direction from FIG. 4 to FIG. 7 until gradually the break-over plate 31 moves into a final locked position as shown in FIGS. 3 and 7 locking the second arm portion in a generally horizontal working position and in line with the first arm portion as clearly seen in FIGS. 2 and 3.

With the parts in the folded carrying position of FIG. 1 the operation of this row marking device is as follows. At first the operator applies hydraulic fluid to the inlet 33 of servo motor 28. This causes the parts 30, 31, 32 and 25 to unfold as shown in FIGS. 4 through 7. When the second arm portion reaches a position where its outer end will not strike the ground, the operator cuts off the hydraulic fluid from the inlet 38 of servo motor 36 and applies the same slowly to the hydraulic inlet 38a of motor 36. The servo motor 36 then oscillates the first arm portion from the position of FIG. 1 to the position of FIGS. 2 and 3. This causes the first and second arm portions to be finally positioned in a straight line generally horizontal as seen in FIG. 3 with the parts in the locked position described in connection with FIG. 7. In the reverse operation the operator cuts off the hydraulic fluid from the inlet 33 of servo motor 28 and at the same time applies hydraulic fluid to the inlet 38 of servo motor 36. This causes the servo motor 36 to rotate the inner arm portion from the position of FIG. 3 to the position of FIG. 1. At the same time gravity causes the outer end of the row marker to fold in a sequence running backward from FIG. 7 back to FIG. 4 so that the parts end up in the position of FIG. 1.

The construction of this invention causes the inner arm portion to fold through about 86 degrees of oscillation from the position of FIG. 3 to the position of FIG. 1. This is an improvement over U.S. Pat. No. 3,072,200, granted Jan. 8, 1963 to D. H. Yerkes. The row marker as described herein will create a farm implement which is at least 2 feet narrower than that necessary as described in the Yerkes patent. At the same time the device disclosed herein will not cause the second arm portion to swing back and forth during transportation because the pivotal connection between the first arm portion and the second arm portion consists entirely of rigid members pivotally connected firmly together with no lost motion connection. One of the problems solved by the present invention overcome by the use of the break-over plate is the elimination of the chains, cables, rods and springs of the prior art that will be contributing factors to trouble.

What is claimed is:

1. A row marker apparatus adapted to be used with a tractor having a hydraulic system and having a tool bar carried by the tractor for movement over the ground, said row marker apparatus comprising a frame for mounting on one end of said tool bar, a marking arm including a first arm portion having its inner end pivotally attached on a horizontal pivot on said frame for oscillation between a substantially horizontal working position and a substantially vertical carrying position, said marking arm including a second arm portion having one end pivotally attached to the outer end of said first arm portion at a pivot shaft for oscillating movement between a generally vertical carrying position close to said first arm portion in carrying position and a generally horizontal working position in alignment with said first arm portion in its working position, a marking element attached to the outer of said second arm portion, power control means for moving said marking arm between its carrying and working positions, said means including a first servo motor operatively connected between said frame and said inner end of said first arm portion for moving the latter between its carrying and its working position, a second servo motor having a cylinder and a piston reciprocatable therein and a piston rod, means on said tractor for operating said first and second servo motors by said hydraulic system, said second servo motor having pivotal attachment points respectively at one end of said cylinder and at the outer end of said piston rod, a lift arm parallel with and rigid with said second arm portion and extending inwardly beyond said pivot shaft, an L-shape connecting saddle piece rigid with said lift arm at its inner end and having a portion extending at a right angle upwardly therefrom in said working position, and a break-over plate having one end pivotally connected at a first pivot to one of said attachment points and having its other end pivotally connected at a second pivot point at the outer end of said right angle portion of said L-shape connecting saddle piece, the other attachment point being pivotally connected at a third pivot point to said first arm portion in such a position that in said working position said three pivot points are substantially in line so that said first servo motor when operated in working direction holds said first arm portion generally horizontal, and said second servo motor when operated in working direction moves said lift arm from one side of said pivot shaft to the other and holds said second arm portion locked in line with said first arm portion in said working position.

2. A row marker apparatus as defined in claim 1, including a like row marker apparatus mounted on the other end of said tool bar.

3. A row marker apparatus as defined in claim 1, wherein said first arm portion comprises a pair of spaced generally parallel side members, said second arm portion comprises a pair of generally parallel side members spaced to lie closely side-by-side with said first named side members, one of said pairs of side members overlapping respectively said other pair of side members at said pivot shaft, said pivot shaft connection between said first and second arm portions positioned in said overlapping parts, and stop means on one of said pair of arm members engaging the other of said pair of arm members in said working position, said stop means urged in stop direction by ground pressure acting upwardly on said marking element on said second arm portion.

* * * * *